(12) United States Patent
Aktas

(10) Patent No.: US 10,252,644 B2
(45) Date of Patent: Apr. 9, 2019

(54) TIP AND SLIDE SYSTEM FOR A VEHICLE SEAT

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 15/257,157

(22) Filed: Sep. 6, 2016

(65) Prior Publication Data

US 2018/0065510 A1 Mar. 8, 2018

(51) Int. Cl.
*B60N 2/20* (2006.01)
*B60N 2/06* (2006.01)

(52) U.S. Cl.
CPC .............. *B60N 2/20* (2013.01); *B60N 2/06* (2013.01)

(58) Field of Classification Search
None
See application file for complete search history.

(56) References Cited

U.S. PATENT DOCUMENTS

| 5,927,809 | A | 7/1999 | Tame |
| 6,290,297 | B1 | 9/2001 | Yu |
| 7,325,876 | B2 | 2/2008 | Lavoie et al. |
| RE41,964 | E | 11/2010 | Hellrung et al. |
| 8,720,997 | B2 | 5/2014 | Kalinowski |
| 9,365,137 | B2 | 6/2016 | Lee et al. |
| 9,919,622 | B2* | 3/2018 | Tame .................. B60N 2/0248 |
| 2003/0080601 | A1* | 5/2003 | Charras ................. B60N 2/206 297/378.12 |
| 2010/0283301 | A1* | 11/2010 | Shanmugam ........... B60N 2/12 297/344.1 |
| 2013/0341985 | A1* | 12/2013 | Tsuruta ................ B60N 2/2356 297/354.1 |
| 2014/0110986 | A1* | 4/2014 | Yamaguchi ............. B60N 2/68 297/378.1 |
| 2015/0108808 | A1* | 4/2015 | Schukalski .............. B60N 2/06 297/341 |
| 2018/0015846 | A1* | 1/2018 | Aktas ....................... B60N 2/12 |

* cited by examiner

*Primary Examiner* — David E Allred
(74) *Attorney, Agent, or Firm* — Vichit Chea; Price Heneveld LLP

(57) ABSTRACT

A vehicle seat includes a seatback pivot, a rear-access lever that rotates an overslide cam and a pawl of the seatback pivot. Operation of the rear-access lever with the seatback pivot in a first radial range defines selective rotation of the overslide cam by the pawl. Operation of the rear-access lever with the seatback pivot in a second radial range defines a deflection of the pawl by the overslide cam.

14 Claims, 15 Drawing Sheets

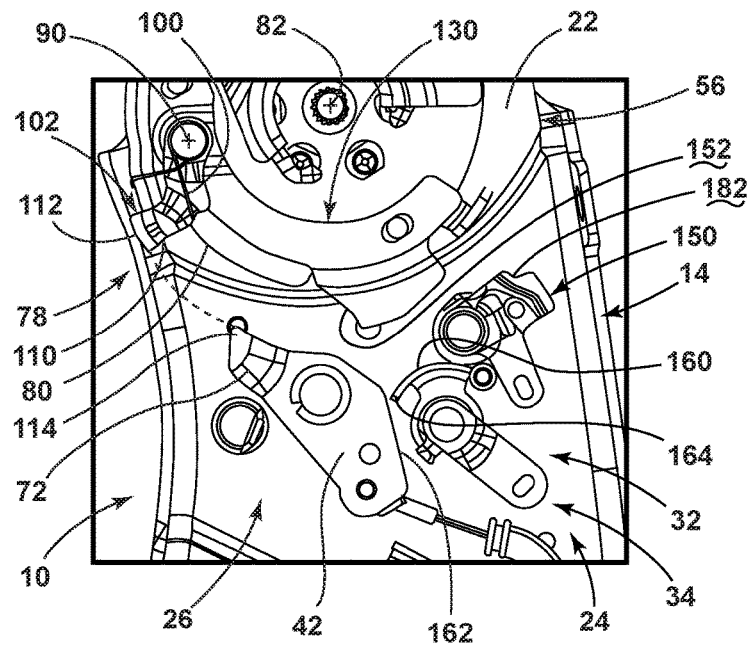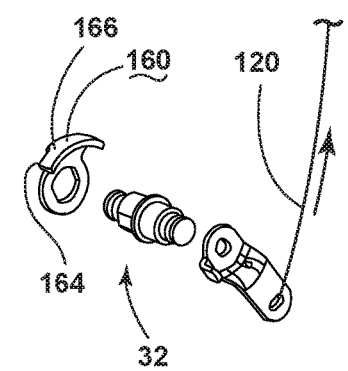
FIG. 10    FIG. 11
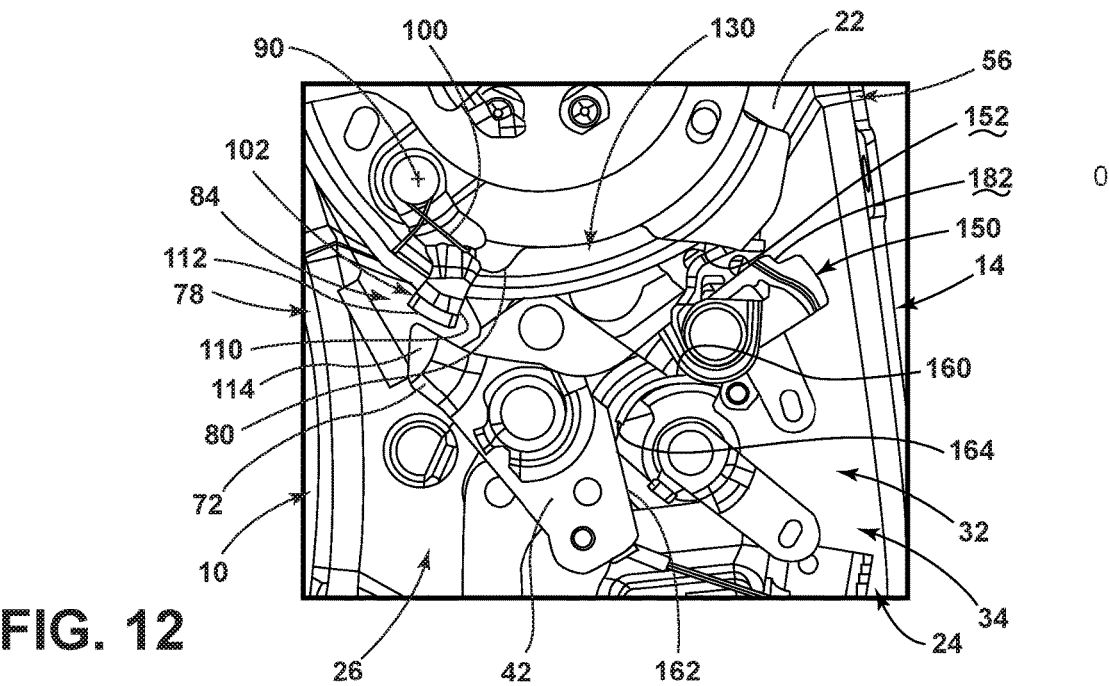
FIG. 12

US 10,252,644 B2

TIP AND SLIDE SYSTEM FOR A VEHICLE SEAT

FIELD OF THE INVENTION

The present invention generally relates to vehicle seats, and more specifically, to a foldable vehicle seat that provides access to a rear portion of a passenger cabin of the vehicle.

BACKGROUND OF THE INVENTION

Various automobiles include multiple seating areas within a passenger cabin. Certain portions of the passenger cabin do not have an exterior door that directly serves that area within the passenger cabin, such as a third row seating area, or a second row seating area within certain two-door vehicles. In order to access these areas of the passenger cabin, certain vehicle seats are able to be moved forward in order to allow for access within these rear portions of the passenger cabin. Typically, these seats perform a combination of tilting and sliding operations to provide such access.

SUMMARY OF THE INVENTION

According to one aspect of the present invention, a vehicle seat includes a seatback having a seatback pivot rotationally coupled to a base. The seatback is selectively operable about the seatback pivot between an upright position, a folded position and a rear-entry position. The rear-entry position is defined between the upright and folded positions. An overslide cam is selectively operable to an activation state that activates an overslide mechanism that selectively defines a sliding operation of the base to a forward-most position. A rear-access lever is in communication with the seatback pivot and the overslide cam, wherein operation of the rear-access lever to an engaged state places the overslide cam in a ready position proximate the seatback pivot. A return pawl extends outwardly from an outer edge of the seatback pivot. Rotation of the seatback pivot into the rear-entry position when the overslide cam is in the ready position further defines the activation state. In the activation state, co-axial rotation of the seatback pivot and the return pawl about a center of the seatback pivot rotates the overslide cam to activate the overslide mechanism. Operation of the rear-access lever when the seatback pivot is proximate the rear-entry position defines a non-activation state. In the non-activation state, movement of the overslide cam to the ready position deflects the return pawl toward the seatback pivot such that the overslide cam is free of rotation relative to the seatback pivot and the return pawl.

According to another aspect of the present invention, a vehicle seat includes a seatback pivot, a rear-access lever that rotates an overslide cam and a pawl of the seatback pivot. Operation of the rear-access lever with the seatback pivot in a first radial range defines selective rotation of the overslide cam by the pawl. Operation of the rear-access lever with the seatback pivot in a second radial range defines a deflection of the pawl by the overslide cam.

According to yet another aspect of the present invention, a vehicle seat includes a seatback pivot rotationally operable relative to a base. A rear access lever rotates an overslide cam to a ready position relative to the seatback pivot. A pawl is attached to the seatback pivot that selectively defines an activation state where the pawl selectively rotates the overslide cam away from the ready position and a non-activation state wherein the overslide cam deflects the pawl toward the seatback pivot.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 10 is an enlarged elevational view of the overslide actuator;

FIG. 11 is an exploded perspective view of an aspect of the rear access lever for operating the overslide cam of FIG. 10;

FIG. 12 is an enlarged elevational view of an aspect of the overslide actuator of FIG. 10 and showing the seatback pivot in a deactivated state;

DETAILED DESCRIPTION OF THE PREFERRED EMBODIMENTS

Figure 1:
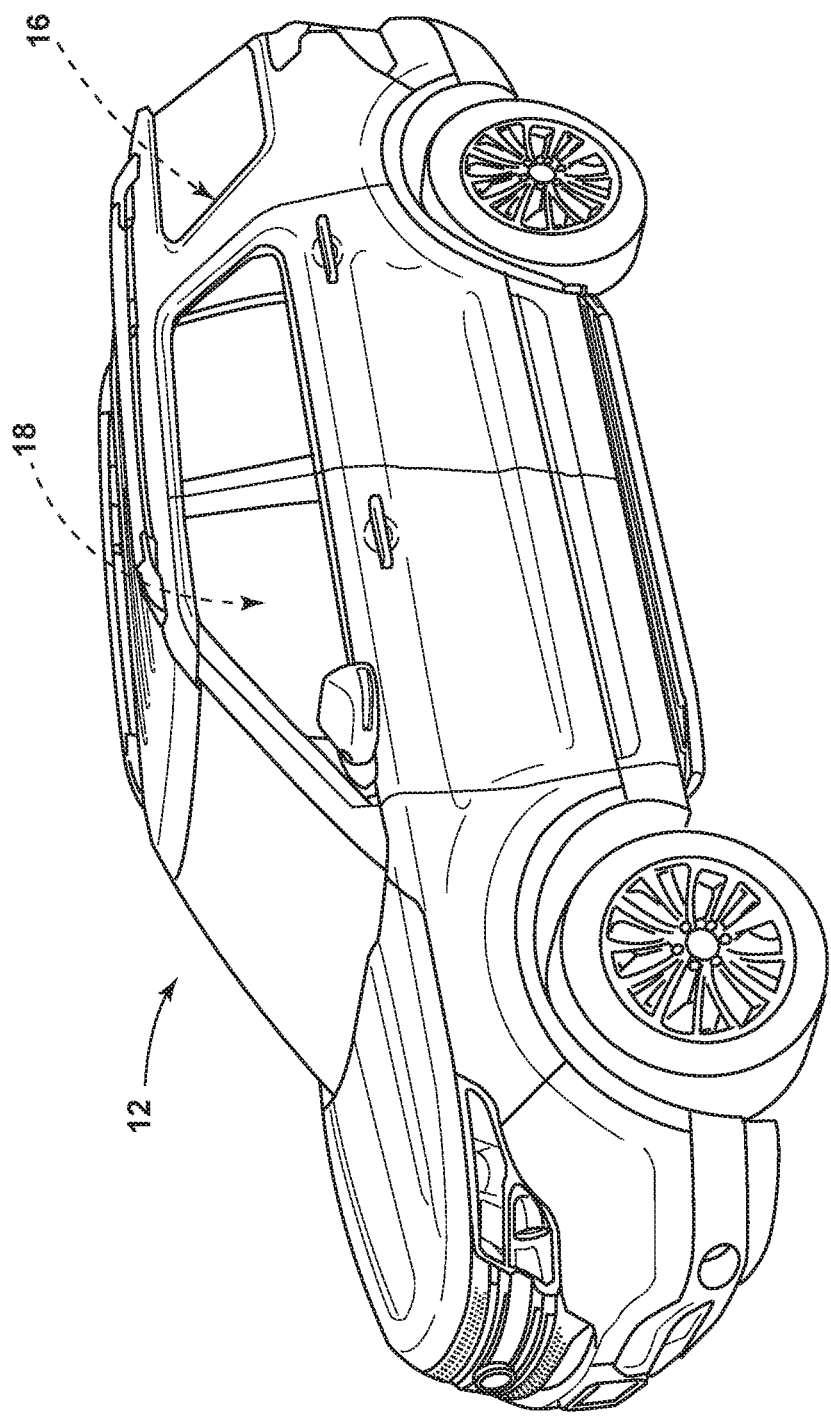
FIG. 1 is a side perspective view of a vehicle having seats that incorporate an aspect of the tip and slide mechanism incorporated therein.
Figure 2:
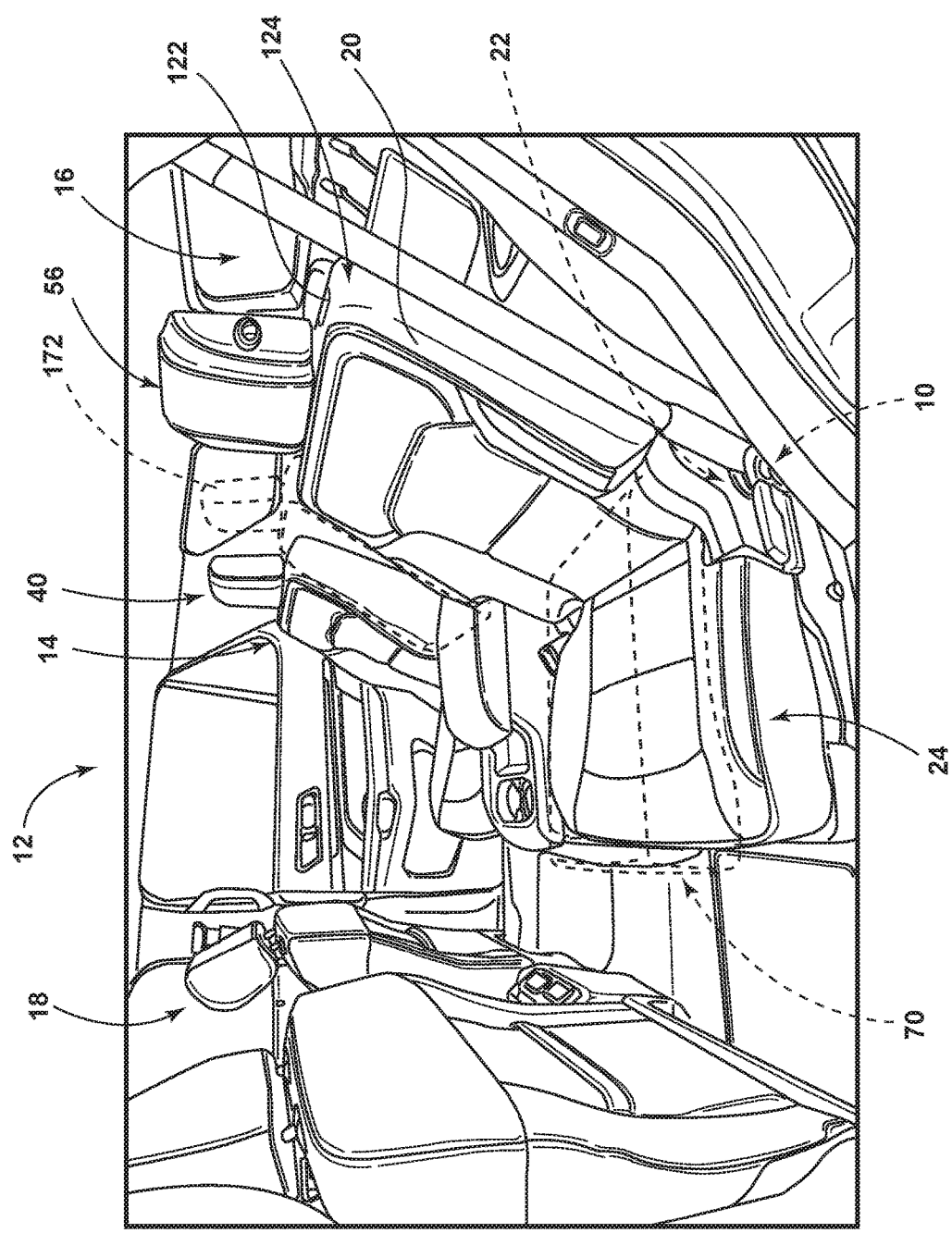
FIG. 2 is a perspective view of the second row of seating within the passenger cabin of the vehicle of FIG. 1.
Figure 3:
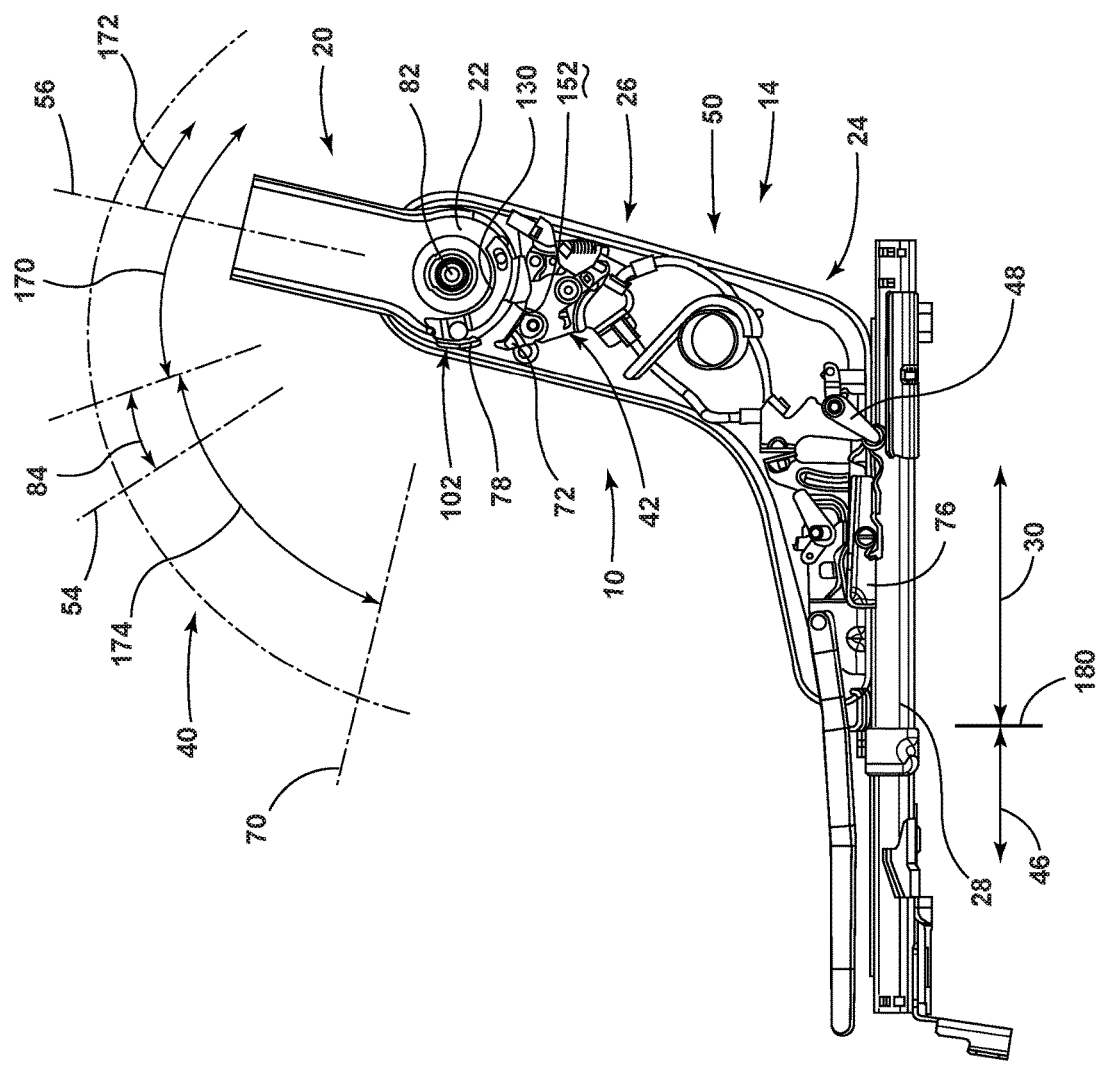
FIG. 3 is a partial elevation view of the seat structure incorporating the tip and slide mechanism.
Figure 4:
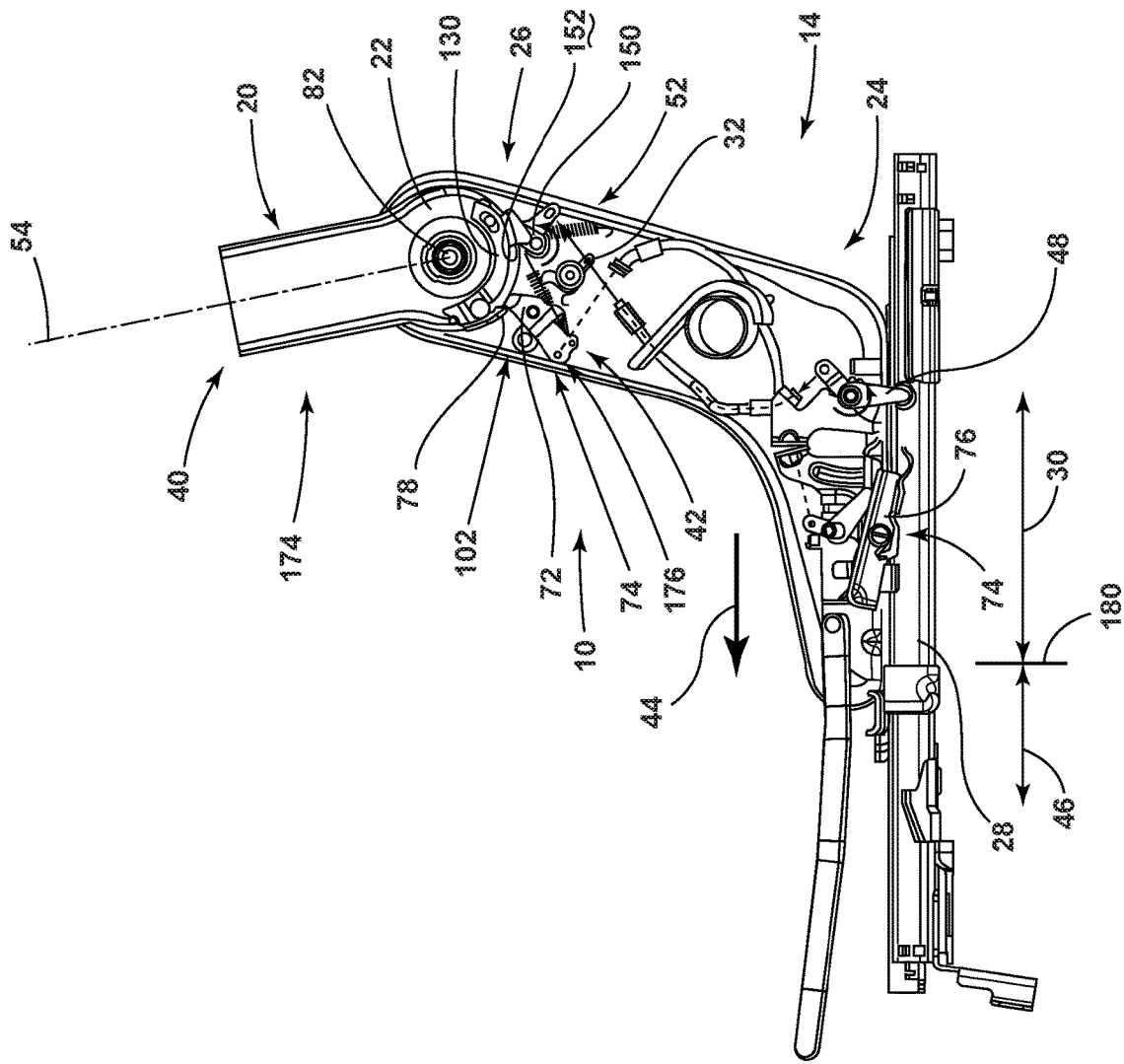
FIG. 4 is a partial elevational view of the seat frame of FIG. 3 showing the seatback moved to a rear-entry position.
Figure 5:
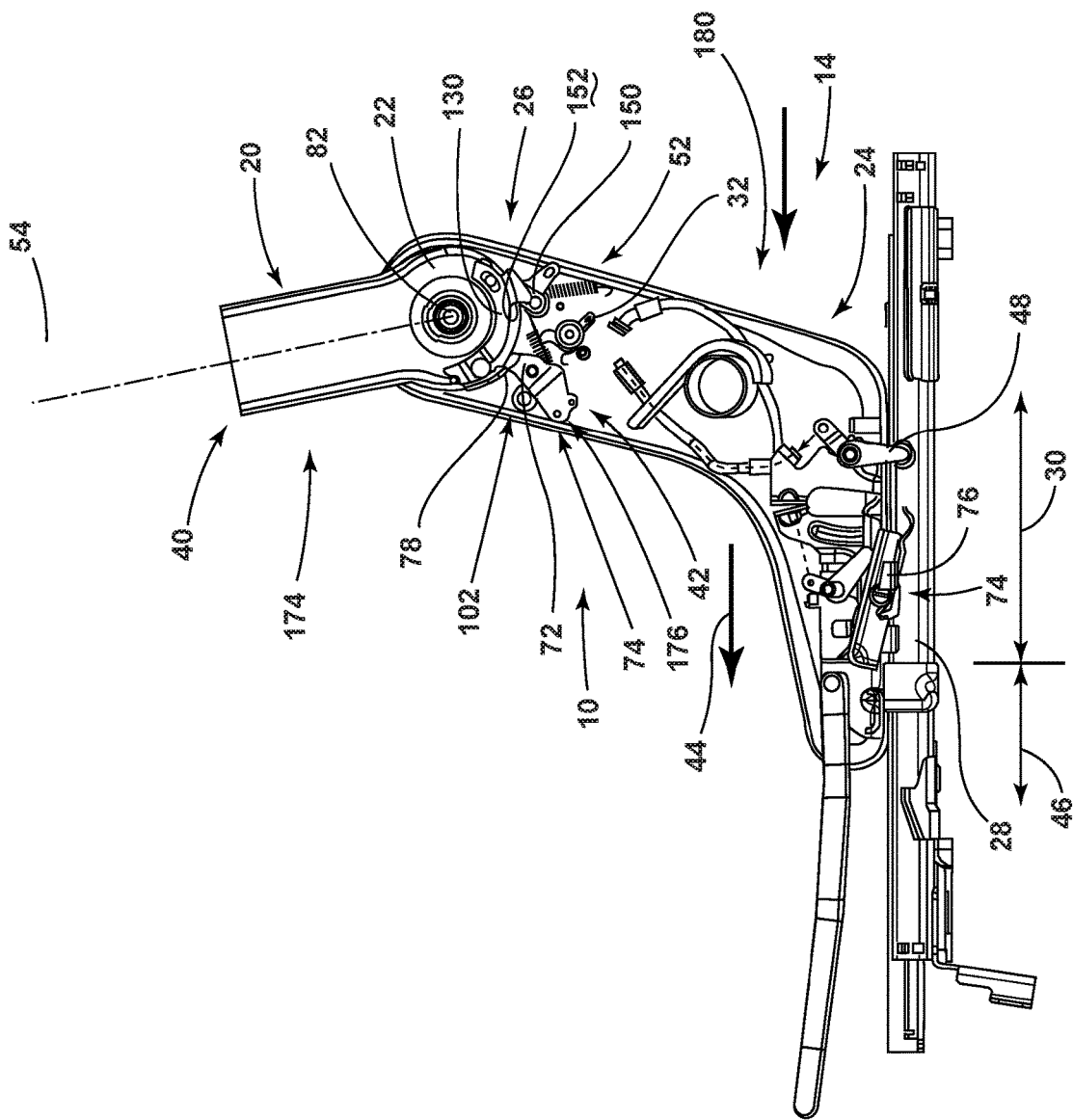
FIG. 5 is a partial elevational view of the seat frame of FIG. 4 with the seat moved forward to the forward-most comfort position.
Figure 6:
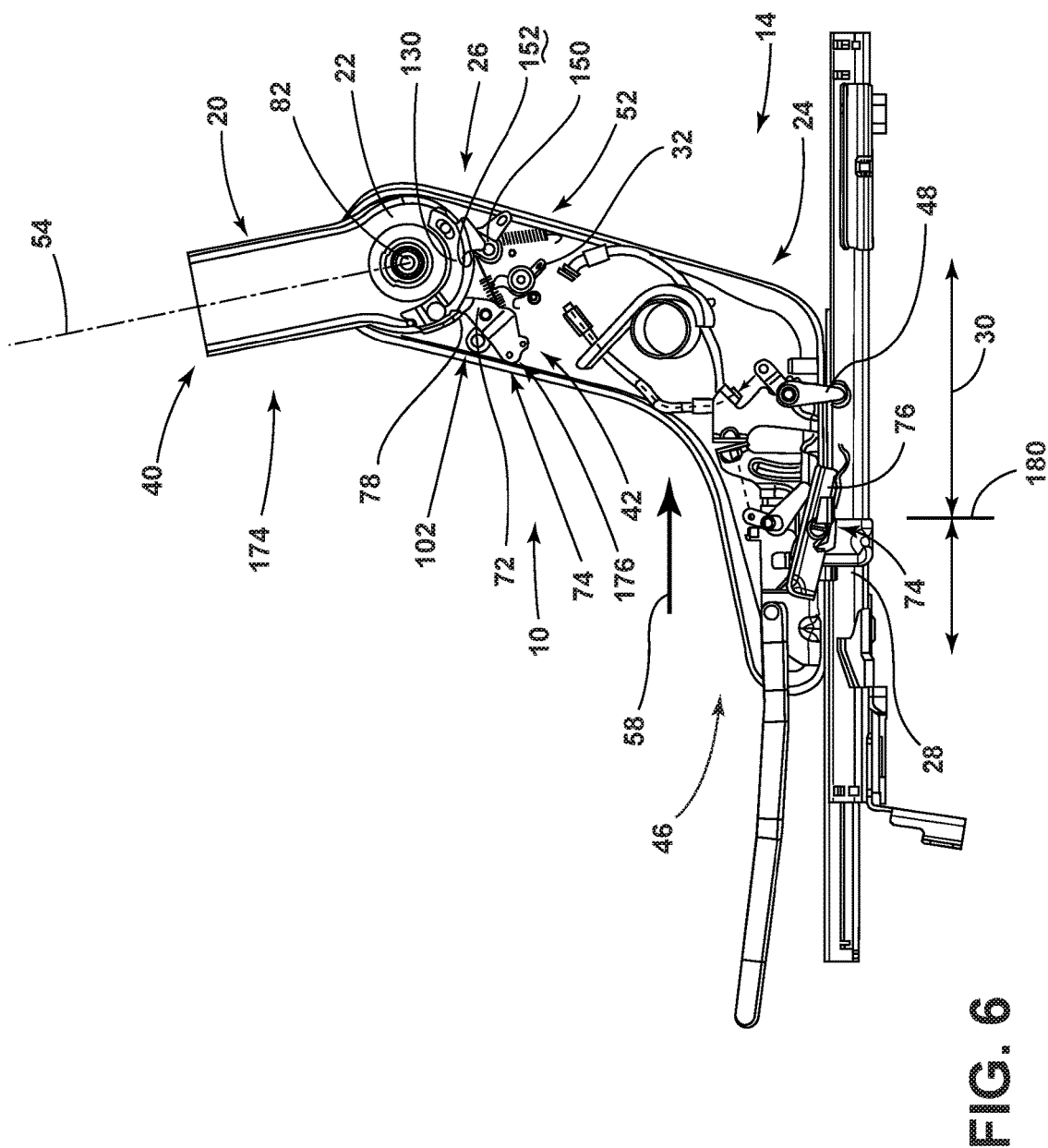
FIG. 6 is a partial elevational view of the seat frame of FIG. 5 with the seat moved past the forward-most comfort position and into a forward-most non-seating position.
Figure 7:
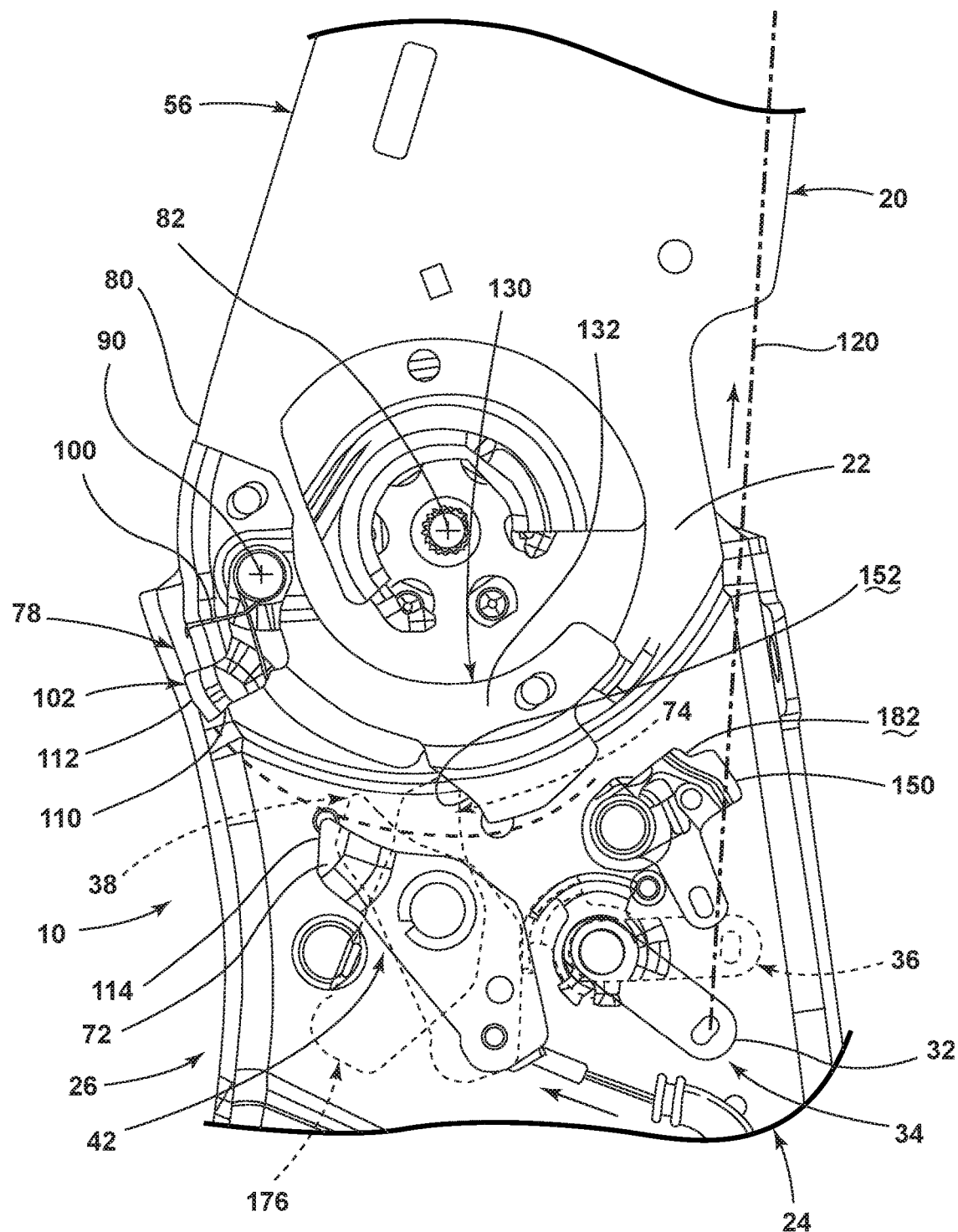
FIG. 7 is an enlarged elevational view of an aspect of the track overslide actuator incorporated within the seat frame, showing the track overslide actuator in a deactivated state.
Figure 8:
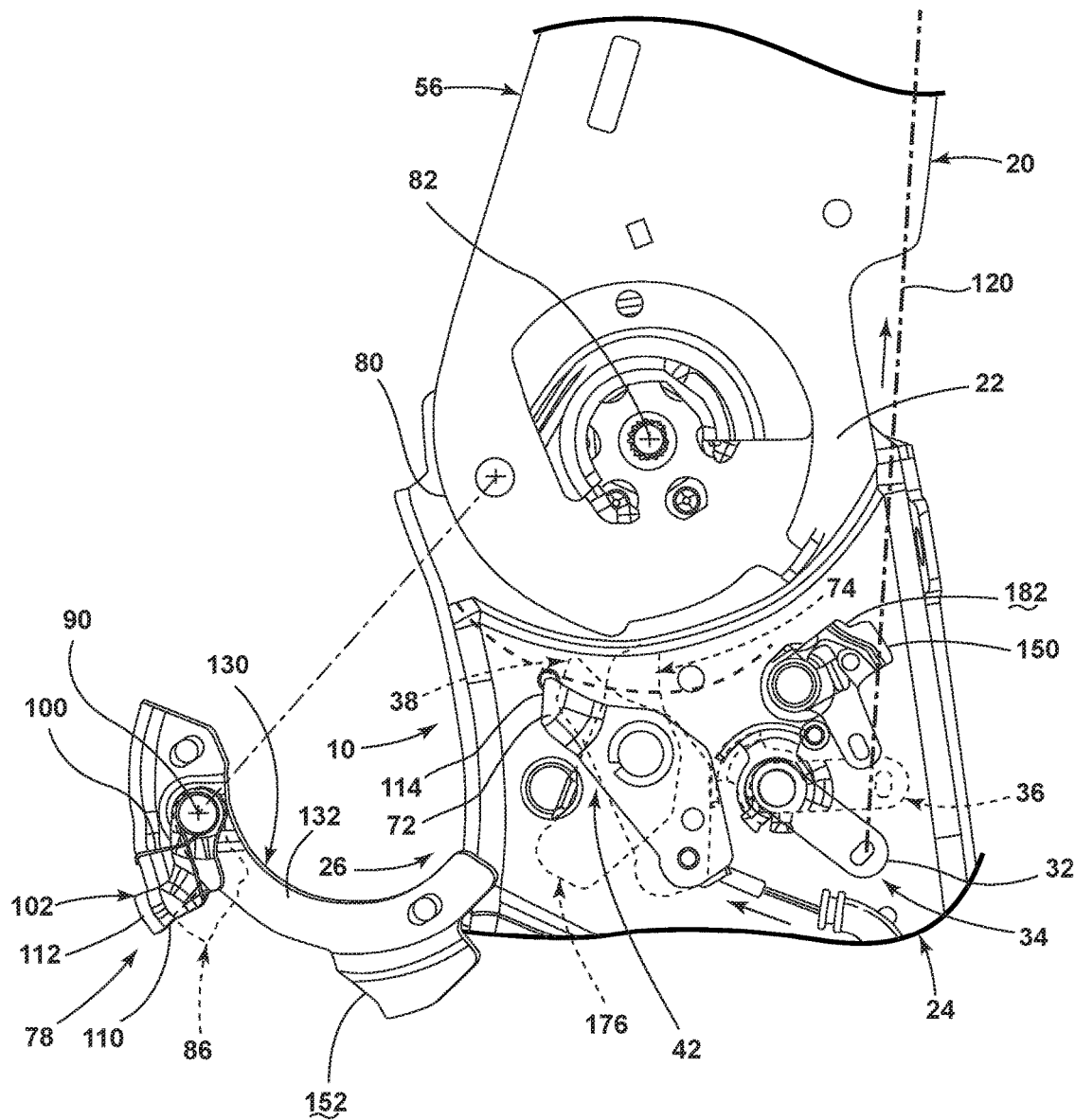
FIG. 8 is a partially exploded view of a seatback pivot with an aspect of the bracket interlock module removed therefrom.
Figure 9:
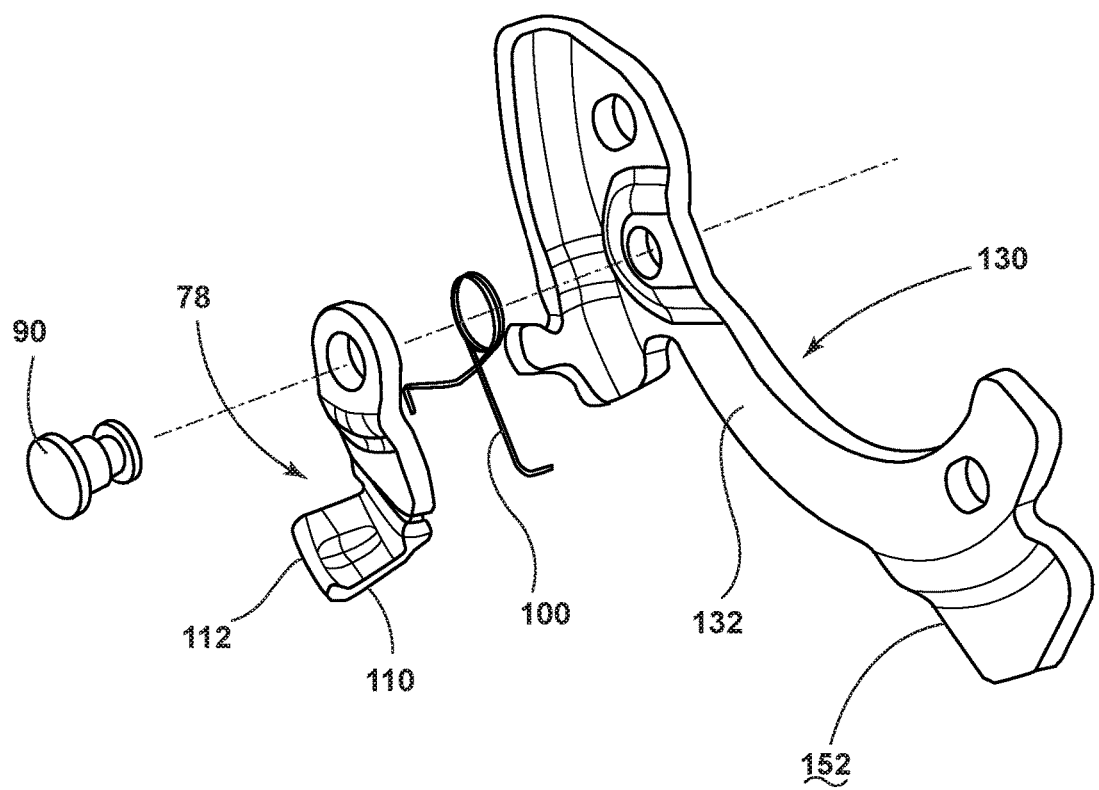
FIG. 9 is an exploded perspective view of an aspect of the bracket interlock module of FIG. 8.
Figure 13:
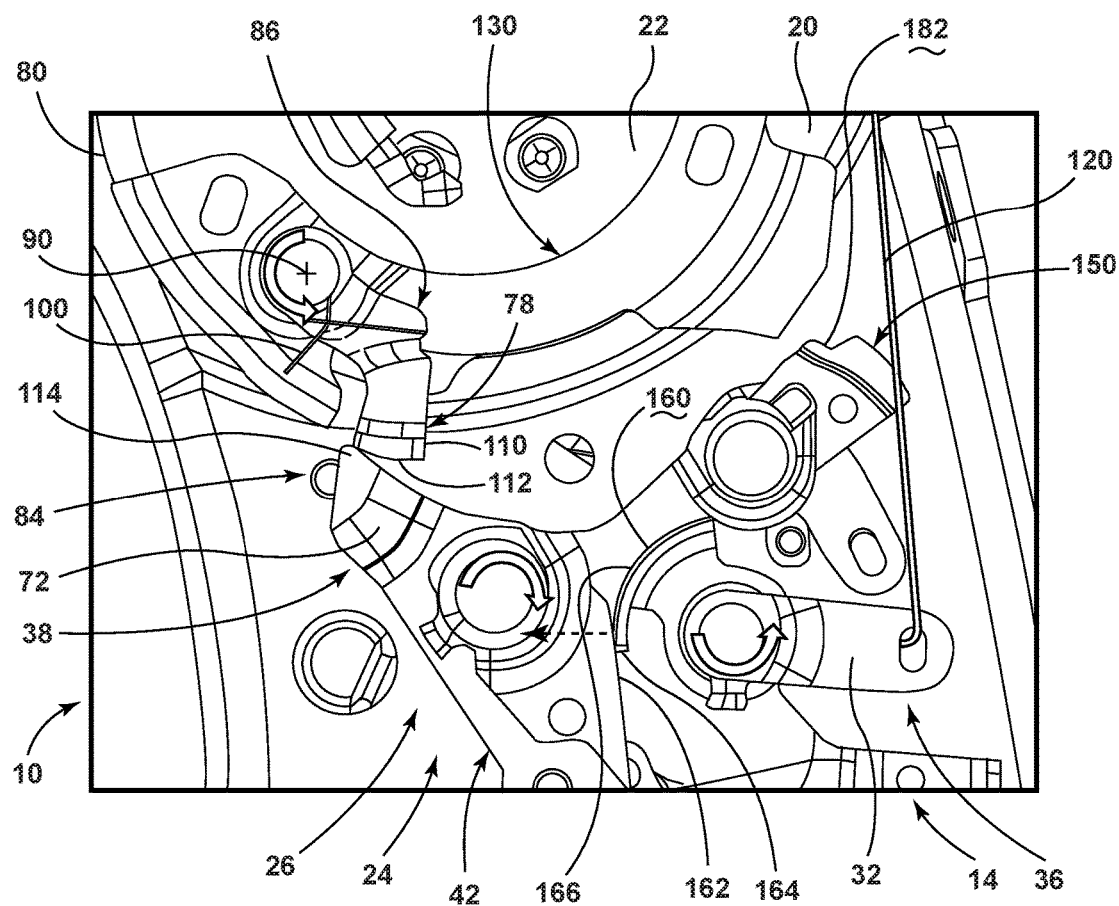
FIG. 13 is an elevational view of the overslide actuator of FIG. 12 with the seatback pivot in the deactivated state and the overslide cam moved into the ready position.
Figure 14:
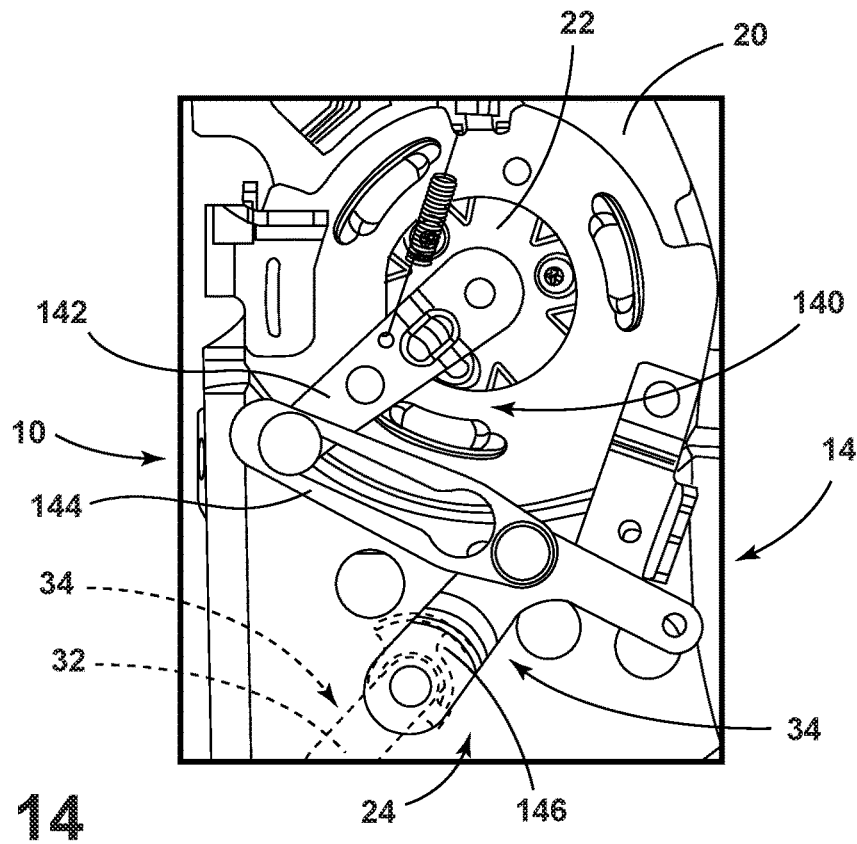
FIG. 14 is an elevational view of the overslide actuator of FIG. 10 showing the rear access lever in an idle state.
Figure 15:
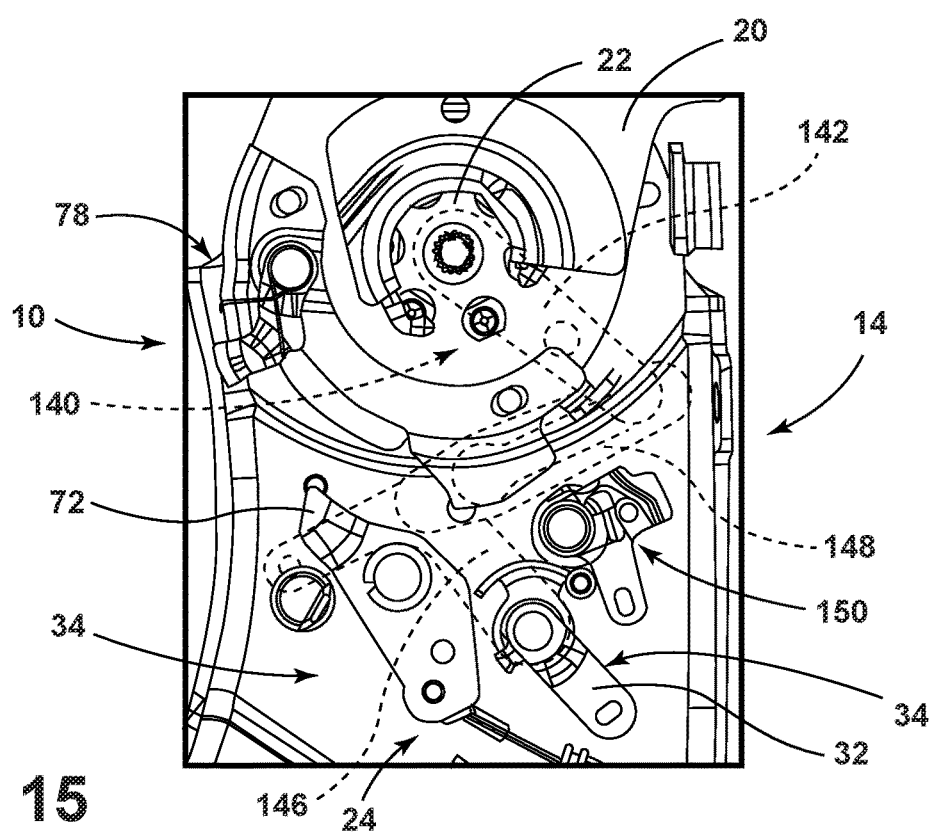
FIG. 15 is an opposing elevational view of the seat frame of FIG. 15 and illustrating an aspect of the seat-rotating mechanism.
Figure 16:
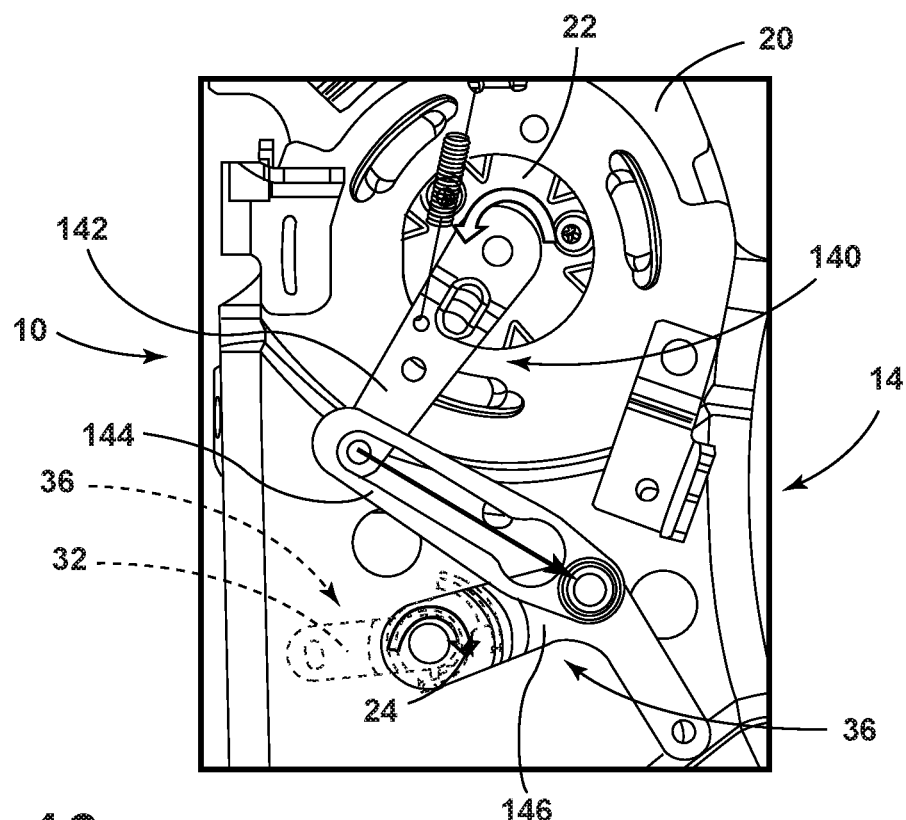
FIG. 16 is an elevational view of the actuating assembly of FIG. 14 showing the rear access lever in an engaged state and the overslide cam in a ready position.
Figure 17:
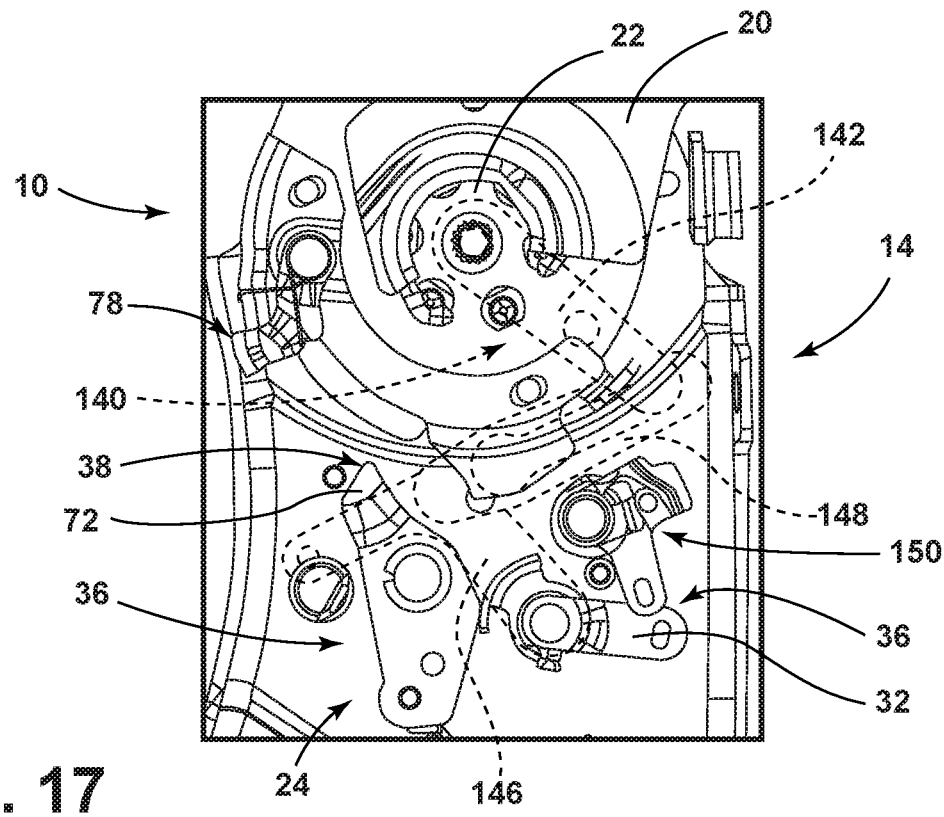
FIG. 17 is an opposing elevational view of the seatback pivot of FIG. 16 showing the seat-rotating mechanism being activated by the rear access lever.
Figure 18:
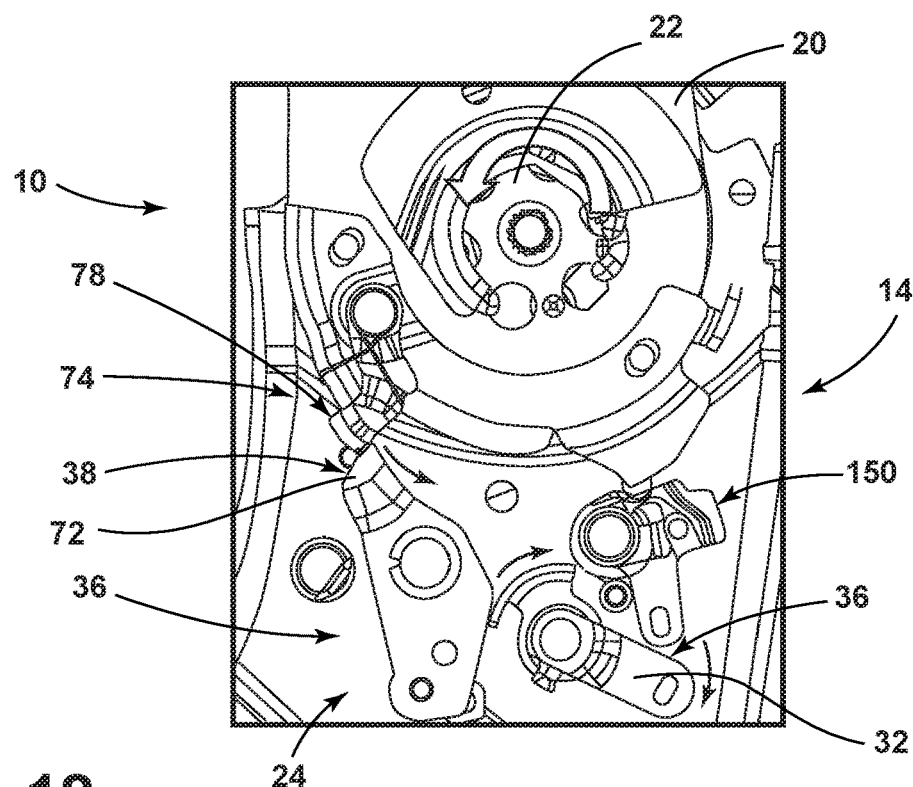
FIG. 18 is an elevational view of the seatback pivot of FIG. 17 showing the seatback pivot moving toward the rear-entry position.
Figure 19:
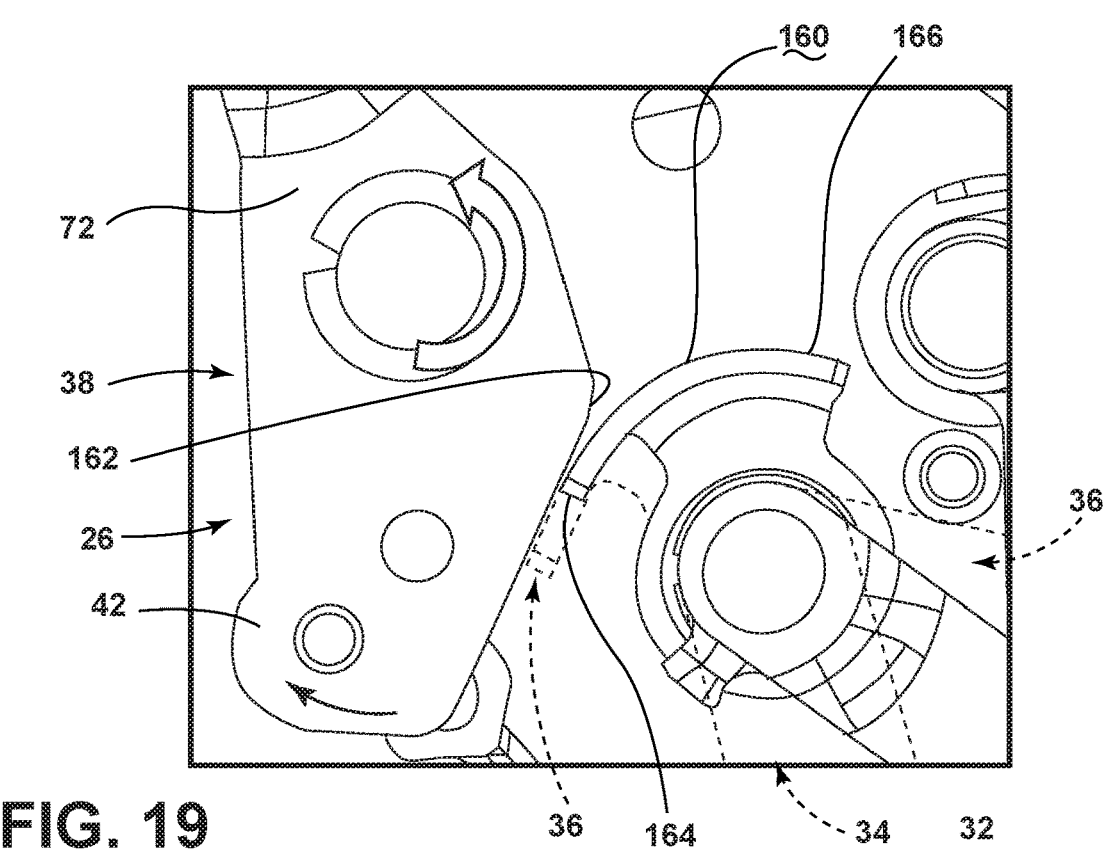
FIG. 19 is an enlarged elevational view of the engagement between an actuating surface of the rear access lever and the overslide cam.
Figure 20:
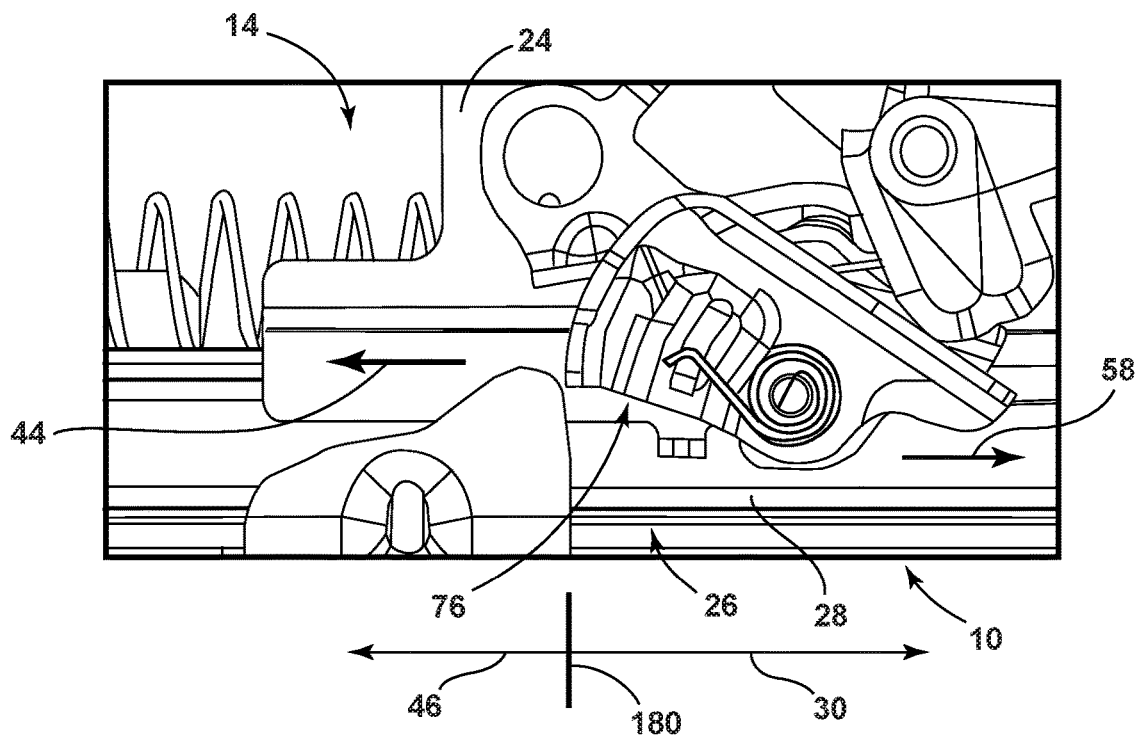
FIG. 20 is an enlarged elevational view of an aspect of the track overslide actuator in an activated state.
Figure 21:
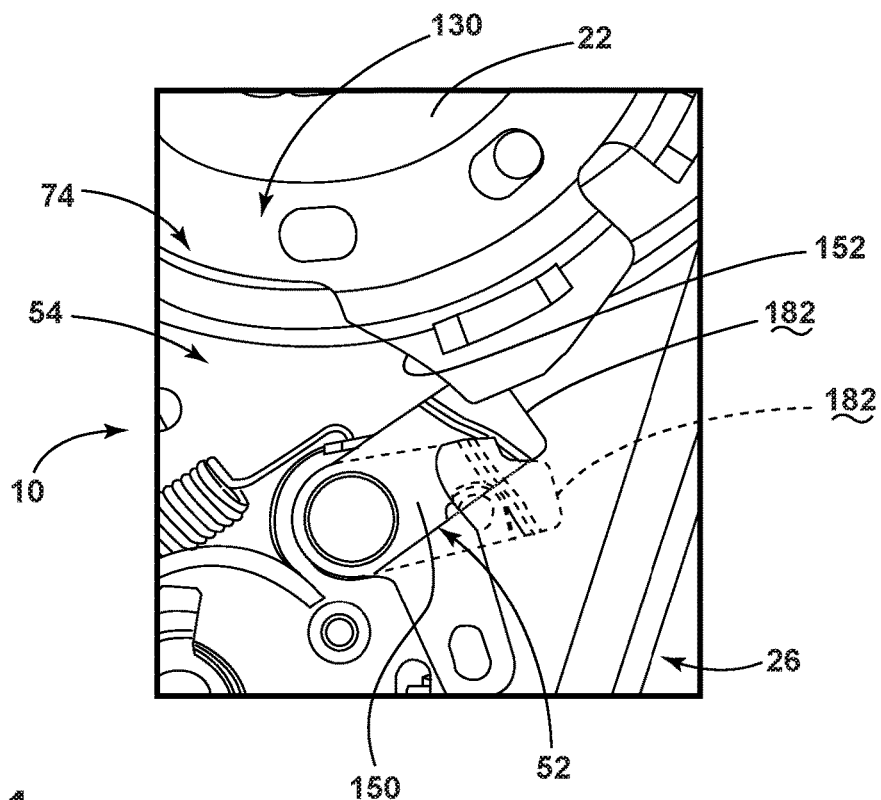
FIG. 21 is an enlarged elevational view of an aspect of the seatback pivot incorporating the interlock cam having a plurality of blocking surfaces defined therein.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-6, reference numeral 10 generally refers to a tip and slide mechanism for a vehicle 12 incorporated within a vehicle seat 14 for allowing access to rear portions 16 of a passenger cabin 18 of the vehicle 12. The vehicle seat 14 includes a seatback 20 having a seatback pivot 22 that is rotationally coupled to a base 24 at a rear access assembly 26. The seatback 20 is selectively operable about the seatback pivot 22 between a plurality of rotational positions 40. The base 24 is also slidable along a track 28 in at least a plurality of comfort positions 30. A rear access lever 32 is disposed in communication with the seatback pivot 22 and the rear access assembly 26. Operation of the rear access lever 32 from an idle state 34 to an engaged state 36 places the rear access assembly 26 in a ready position 38. It is contemplated that the ready position 38 at least partially obstructs the rotation of the seatback pivot 22 from defining the plurality of rotational positions 40 of the seatback 20. A track overslide actuator 42 of the rear access assembly 26 is disposed in communication with the seatback pivot 22 and the track 28. It is contemplated that after the rear access assembly 26 is placed in the ready position 38 through operation of the rear access lever 32, operation of the seatback pivot 22 to a rear-entry position 54 serves to activate the track overslide actuator 42. Activation of the track overslide actuator 42, in turn, serves to provide slidable forward operation 44 of the base 24 along the track 28 and beyond the plurality of comfort positions 30 to a rear-access position 46. An interlock actuator 48 of the rear access assembly 26 is disposed in communication with the seatback pivot 22 and the track 28. When the track overslide actuator 42 is activated, forward operation 44 of the base 24 along the track 28 from a home position 50 activates the interlock actuator 48 into a blocking position 52. The blocking position 52 of the interlock actuator 48 serves to rotationally lock the seatback pivot 22 and, in turn, the seatback 20 in the rear-entry position 54. Subsequent rearward sliding movement 58 of the base 24 back toward and into the home position 50 of the base 24 serves to disengage the interlock actuator 48 from the blocking position 52. Moreover, movement of the seatback pivot 22 from the rear-entry position 54 to an upright position 56 serves to disengage the track overslide actuator 42.

Referring now to FIGS. 3-13, the seatback 20 is selectively operable about the seatback pivot 22 between the plurality of rotational positions 40. These rotational positions 40 can include the upright position 56, a folded position 70 and the rear-entry position 54. According to various embodiments, it is contemplated that the rear-entry position 54 is defined between the upright and folded positions 56, 70. An overslide cam 72 of the track overslide actuator 42 is selectively operable into an activation state 74 that serves to activate an overslide mechanism 76 of the track overslide actuator 42 that selectively defines the sliding operation of the base 24 beyond the plurality of comfort positions 30 and to the rear-access position 46. The rear access lever 32 is adapted to be in communication with the seatback pivot 22 and the overslide cam 72. Operation of the rear access lever 32 to the engaged state 36 serves to place the overslide cam 72 in the ready position 38 proximate the seatback pivot 22. A return pawl 78 extends outwardly from an outer edge 80 of the seatback pivot 22. It is contemplated that rotation of the seatback pivot 22 into the rear-entry position 54, when the overslide cam 72 is in the ready position 38, further defines the activation state 74. In this manner, when in the activation state 74, co-axial rotation of the seatback pivot 22 and the return pawl 78 about a center 82 of the seatback pivot 22 rotates the overslide cam 72 to activate the overslide mechanism 76. Operation of the rear access lever 32 when the seatback pivot 22 is proximate the rear-entry position 54, such that the overslide cam 72 is positioned adjacent to the return pawl 78, defines a non-activation state 84. In the non-activation state 84, movement of the overslide cam 72 into the ready position 38 serves to deflect the return pawl 78 toward the seatback pivot 22 such that the overslide cam 72 is free of rotation relative to the seatback pivot 22 and the return pawl 78. Accordingly, in the non-activation state 84, rotation of the seatback pivot 22 and the return pawl 78 about the center 82 of the seatback pivot 22 slides the return pawl 78 against the overslide cam 72 such that the overslide cam 72 is not rotated out of the ready position 38 and the overslide mechanism 76, in turn, is not activated.

Referring again to FIGS. 7-13, it is contemplated that the return pawl 78 is outwardly biased relative to the seatback pivot 22. In the non-activation state 84, when the overslide cam 72 moves to the ready position 38, the pawl 78 is deflected to a deflected state 86. This deflection of the return pawl 78 is defined by rotation of the return pawl 78 about a pawl pivot 90. It is contemplated that the pawl pivot 90 is positioned distal from the center 82 of the seatback pivot 22. Typically, the pawl pivot 90 will be positioned proximate the outer edge 80 of the seatback pivot 22. According to the various embodiments, the return pawl 78, in a non-deflected position, extends outward from the outer edge 80 of the seatback pivot 22. Accordingly, at least a portion of the return pawl 78 stands proud with respect to the outer edge 80 of the seatback pivot 22.

In the activation state 74, when the overslide cam 72 is in the ready position 38, the overslide cam 72 is positioned such that rotation of the seatback pivot 22 and the pawl 78 will allow those portions of the return pawl 78 that are proud of the seatback pivot 22 to engage the overslide cam 72 to define the activation state 74 of the overslide cam 72 and the overslide mechanism 76. It is contemplated that when the overslide cam 72 is in the ready position 38 in both the activation and non-activation states 74, 84, the overslide cam 72 is free of direct engagement with the outer edge 80 of the seatback pivot 22.

Referring again to FIGS. 7-13, it is contemplated that the return pawl 78 can include a return spring 100 that outwardly biases the return pawl 78 to an outward state 102 of the return pawl 78. It is contemplated that, in the non-activation state 84, movement of the return pawl 78 to the deflected state 86 by the overslide cam 72 serves to selectively overcome the biasing force applied by the return spring 100. Slidable disengagement of the overslide cam 72 from the return pawl 78 thereby allows the return spring 100 to bias the return pawl back into the outward state 102. In this manner, the outward state 102 of the return pawl 78 is defined by portions of a return pawl 78 standing proud of the outer edge 80 of the seatback pivot 22. When the return pawl 78 is in the deflected state 86, the portions of the return pawl 78 that typically stand proud of the outer edge 80 of the seatback pivot 22 are deflected inward to be more in-line with the outer edge 80 of the seatback pivot 22. Because the overslide cam 72, in the ready position 38, is free of engagement with the outer edge 80 of the seatback pivot 22, the return pawl 78 in the deflected state 86 may still be positioned slightly outward of the outer edge 80 of the seatback pivot 22. This configuration allows for the slidable engagement between the overslide cam 72 and the return pawl 78 indicative of the non-activation state 84.

Referring again to FIGS. 7-13, it is contemplated that the return pawl 78 can include an engaging portion 110 and a deflecting portion 112. The engaging portion 110 of the return pawl 78 is adapted to selectively engage the overslide cam 72 when in the ready position 38 and when the tip and slide mechanism 10 defines the activation state 74. In this manner, rotation of the seatback pivot 22 to the rear-entry position 54 serves to cause the engaging portion 110 of the return pawl 78 to push against the overslide cam 72 and rotate the overslide cam 72 in the activation state 74 to activate the overslide mechanism 76. The deflecting portion 112 of the return pawl 78 is adapted to receive an end portion 114 of the overslide cam 72 when in the non-activation state 84. In this manner, the deflecting portion 112 is adapted to be biased by the end portion 114 of the overslide cam 72 and also slide against portions of the overslide cam 72 to prevent rotation of the overslide cam 72 that would typically define the activation state 74. According to the various embodiments, the engaging portion 110 can be a surface that extends generally radially outward from the seatback pivot 22, such that the engaging portion 110 can engage and push against the end portion 114 of the overslide cam 72 to define the activation state 74. Conversely, the deflecting portion 112 of the return pawl 78 is positioned generally concentric with a center 82 of the seatback pivot 22 and generally perpendicular with the engaging portion 110 of the return pawl 78, such that a minimum amount of friction is experienced between the deflecting portion 112 of the return pawl 78 and the end portion 114 of the overslide cam 72.

Referring now to FIGS. 3-19, the use of the return pawl 78 can be used to prevent certain failure modes of the track overslide actuator 42 from occurring, and more specifically, certain failure modes of the rear access lever 32. The incorporation of the return pawl 78 allows for operation of the rear access lever 32 to move the overslide cam 72 into the ready position 38 in both the activation state 74 and non-activation state 84. Accordingly, certain failure modes of the track overslide actuator 42 may not result in excessive tension being placed upon the cable 120 extending from the tip and slide actuator 122 (shown in FIG. 2) positioned at the top region 124 of the vehicle seat 14 and the rear-access lever 32. The failure mode is communicated to the user, not through failure at the tip and slide actuator 122, but by the seatback 20 and seatback pivot 22 rotating forward and beyond the rear-access position 46. This over-rotation provides an indication to the user that the engaging portion 110 of the return pawl 78 did not engage with the overslide cam 72 to define the activation state 74. Rather, the failure mode is defined by the overslide cam 72 pushing against the deflecting portion 112 of the return pawl 78 to define the deflected state 86, the return pawl 78 and the seatback pivot 22 can thereby be rotated beyond the rear-entry position 54 and into the folded position 70 of the seatback 20, if desired. The user can then return the seatback pivot 22 toward the upright position 56. Once the seatback pivot 22 is rotated a sufficient rotational distance, the overslide cam 72 disengages the deflecting portion 112 of the return pawl 78 and the return spring 100 biases the pawl 78 to the outward state 102. By rotating the seatback pivot 22 in this fashion, the user can place the tip and slide mechanism 10 in the activation state 74 without rotating the seatback 20 all the way back to the upright position 56 and without resetting the rear-access lever 32.

Referring again to FIGS. 3-19, it is contemplated that the return pawl 78 can be included within a bracket interlock module 130 that attaches to the outer edge 80 of the seatback pivot 22. In this manner, the bracket interlock module 130 can be a separate piece that is fastened, welded, adhered, or otherwise attached to the outer edge 80 of the seatback pivot 22. In such an embodiment, it is contemplated that the pawl pivot 90 is located within a portion of the bracket interlock module 130. Additionally, it is contemplated that the return spring 100 that outwardly biases the return pawl 78 toward the outward state 102 can be attached to the return pawl 78 and a body 132 of the bracket interlock module 130. According to various embodiments, it is also contemplated that the return pawl 78 can be attached directly to a portion of the seatback pivot 22.

According to the various embodiments, the return pawl 78 can be outwardly biased through various mechanisms that can include a torsion spring, a linear spring, elastomeric members, compressible and elastic members, combinations thereof, and other similar elastic and deflectable-type materials. Through the use of such deflecting mechanisms and materials, it is contemplated that the return pawl 78 can be moved to the deflected state 86 through a rotation, as discussed above, or can be moved to the deflected state 86 through a linear movement that serves to compress the biasing member in a generally axial direction. In various embodiments, it is contemplated that the return pawl 78 can itself be an elastic member such that when the overslide cam 72 engages the deflecting portion 112 of the return pawl 78, the return pawl 78 itself deflects in shape or bends, twists, or otherwise deforms to define the non-activation state 84 of the track overslide actuator 42.

Referring now to FIGS. 14-18, the vehicle seat 14 can include a seat-rotating mechanism 140 disposed proximate the seatback pivot 22. The seat-rotating mechanism 140 can serve to selectively operate the seatback 20 at least between the upright and folded positions 56, 70. It is contemplated that the operation of the overslide cam 72 to at least the activation state 74 serves to engage the seat-rotating mechanism 140. It is contemplated that operation of the seatback 20 from the folded position 70 and/or the rear-access position 46 back to the upright position 56 serves to disengage the seat-rotating mechanism 140. It is contemplated that the seat-rotating mechanism 140 can include an activation arm 142 that extends from a center 82 of the seatback pivot 22. The activation arm 142 engages a seat-rotating link 144 that extends from the activation arm 142 to a secondary portion 146 of the rear access lever 32. Operation of the rear access lever 32 to the engaged state 36 also operates the secondary portion 146 in a simultaneous rotational manner. It is contemplated that the rear access lever 32 and the secondary portion 146 are fixedly coupled together such that operation of the rear access lever 32 serves to simultaneously operate the secondary portion 146 of the rear access lever 32.

Referring again to FIGS. 14-18, when the rear access lever 32 is moved to the engaged state 36, the secondary portion 146 moves the seat-rotating link 144 in a substantially linear direction that also pulls on the activation arm 142 of the seat-rotating mechanism 140 to engage the seat-rotating mechanism 140. In this manner, operation of the rear access lever 32 to the engaged state 36 serves to also automatically activate the seat-rotating mechanism 140 to allow for rotation of the seatback 20 and the seatback pivot 22 from the upright position 56 to at least the rear-entry position 54, and in a non-activation state 84, all the way to the folded position 70. It is contemplated that the seat-rotating mechanism 140 can be adapted to disengage once the seatback 20 and/or the seatback pivot 22 are moved to the upright position 56. As will be discussed more fully below, portions of the tip and slide mechanism 10 of the vehicle seat 14 can include separate mechanisms for maintaining a temporarily fixed position of the seatback 20 and seatback pivot 22 in the rear-entry position 54. These mechanisms can include the interlock actuator 48 that defines one or more blocking positions 52 of an interlock cam 150 for engaging interlock surface 152 defined within one of the seatback pivot 22 and/or the bracket interlock module 130.

Referring now to FIGS. 7-19, the rear access lever 32 can include an actuating surface 160 that engages a lever portion 162 of the overslide cam 72. In such an embodiment, operation of the rear access lever 32 rotates the actuating surface 160 against the portion of the overslide cam 72 to rotate the overslide cam 72 into the ready position 38. It is contemplated that the actuating surface 160 can be concentric with the operation of the rear access lever 32. Accordingly, the actuating surface 160 of the rear access lever 32 can maintain the overslide cam 72 in the ready position 38, until the overslide cam 72 moves away from the ready position 38 to define the activation state 74 of the tip and slide mechanism 10.

Referring again to FIGS. 7-19, it is contemplated that the actuating surface 160 of the rear access lever 32 can extend around only a portion of the rear access lever 32. In this manner, the actuating surface 160 can define a leading edge 164 that can abut the lower portion of the overslide cam 72 and help to push the overslide cam 72 towards the ready position 38. The outer face 166 of the actuating surface 160 then maintains engagement with the lower portion and holds the overslide cam 72 in the ready position 38 until the overslide cam 72 rotates in the activation state 74. It is contemplated that the operation of the seatback pivot 22 toward the rear-access position 46 rotates the overslide cam 72 such that the lever portion 162 of the overslide cam 72 disengages from the actuating surface 160. A biasing mechanism disposed within the rear access lever 32 can return the rear access lever 32 to the idle state 34. Engagement of the return pawl 78 with the overslide cam 72 maintains the position of the overslide cam 72 in the activation state 74 until such time as the seatback pivot 22 is returned to the upright position 56.

According to the various embodiments, the vehicle seat 14 can include the seatback pivot 22, and the rear access lever 32 that rotates the overslide cam 72. The return pawl 78 of the seatback pivot 22 can be adapted such that operation of the rear-access lever 32 with the seatback pivot 22 within a first radial range 170 defines selective rotation of the overslide cam 72 by the return pawl 78. It is contemplated that the first radial range 170 of the seatback pivot 22 can be defined between any of the reclined positions 172, the upright position 56 and up to, but typically not including, the rear-access position 46. As discussed above, it is typical that the rear-access position 46 serves to define the non-activation state 84 of the tip and slide mechanism 10 where the end portion 114 of the overslide cam 72 is aligned with the deflecting surface of the return pawl 78. It is also contemplated that operation of the rear access lever 32 when the seatback pivot 22 is in a second radial range 174 defines a deflection of the pawl 78 by the overslide cam 72. It is contemplated that this second radial range 174 can be defined by a rotation of the seatback pivot 22 and the seatback 20 within and near the return pawl 78, such that the end portion 114 of the overslide cam 72 is aligned with the deflecting portion 112 of the return pawl 78. It is contemplated that when the rear access lever 32 is operated to the engaged state 36 and the seatback pivot 22 is in the first radial range 170, movement of the seatback 20 toward the second radial range 174, (i.e., toward the rear-access position 46) serves to move the overslide cam 72 to define the overslide position 176 of the overslide cam 72.

Referring now to FIGS. 7-21, the vehicle seat 14 can include the seatback pivot 22 that is rotationally operable relative to the base 24. The rear access lever 32 serves to rotate the overslide cam 72 to the ready position 38 relative to the seatback pivot 22. The return pawl 78 is attached to the seatback pivot 22, either directly or through the bracket interlock module 130. It is contemplated that the return pawl 78 selectively defines the activation state 74 where the return pawl 78 selectively rotates the overslide cam 72 away from the ready position 38 to the overslide position 176. The return pawl 78 may also define a non-activation state 84 wherein the overslide cam 72 deflects the return pawl 78 toward the seatback pivot 22. The activation state 74 can further be defined by activation of the seatback pivot 22 from the upright position 56 toward the rear-entry position 54, where the rotation of the seatback 20 rotates the pawl 78 into engagement with the end portion 114 of the overslide cam 72 in the ready position 38. It is contemplated that the non-activation state 84 can be further defined by the seatback pivot 22 being proximate the rear-entry position 54 and the overslide cam 72 being moved to the ready position 38. In such a condition, the operation of the overslide cam 72 into the ready position 38 and in the non-activation state 84 deflects the pawl 78 such that the pawl 78 slidably engages the overslide cam 72 when the overslide cam 72 is free of rotation to the overslide position 176 until such time as the seatback pivot 22 is returned to the upright position 56, or other predetermined rotational position 40 adapted to disengage the overslide cam 72 and the remainder of the tip and slide mechanism 10.

Referring again to FIGS. 7-21, it is contemplated that the overslide cam 72, when defined in the activation state 74, allows for selected forward operation 44 of the base 24 in a home position 50 and beyond the forwardmost comfort position 180 and into the rear-entry position 54. This movement of the base 24 toward the rear-entry position 54 activates the interlock cam 150 to define a blocking position 52 of a plurality of blocking positions 52. It is contemplated that each blocking position 52 can correspond to a respective blocking surface 182 of the interlock cam 150. Each respective blocking surface 182 is adapted to engage an interlock surface 152 disposed proximate the seatback pivot 22. It is further contemplated that engagement of one of the respective blocking surfaces 182 with the interlock surface 152 serves to selectively retain the seatback pivot 22 in the rear-entry position 54 until the base 24 is returned to the home position 50 or other lateral position selected to correspond to disengagement of the interlock cam 150 with the interlock surface 152. While two blocking surfaces 182 are shown in the figures, it is contemplated that additional blocking surfaces 182 can be incorporated into the interlock cam 150. As discussed above, each blocking surface 182 corresponds to a respective blocking position 52 that retains the seatback pivot 22 in the rear-entry position 54.

According to various embodiments, it is contemplated that the plurality of blocking surfaces 182 of the interlock cam 150 can be used where portions of the track overslide actuator 42 do not fully rotate as intended. Such lack of full rotation can be the result of an obstruction, insufficient lubrication, possible damage to the system, combinations thereof, or other similar condition that may prevent full operation of the track overslide actuator 42.

It is also contemplated that the lack of full operation of the interlock cam 150 can be the result of a tolerance stack-up where one portion of the tip and slide mechanism 10 may not be capable of full operation such that portions of the tip and slide mechanism 10 operated thereafter may, in turn, only be capable of less than full operation. The incorporation of the plurality of blocking surfaces 182 of the interlock cam 150 can serve to at least partially account for this tolerance stack-up without diminishing the effectiveness or operation of the entire tip and slide mechanism 10. The use of the plurality of blocking surfaces 182 allows for less than full rotation of the interlock cam 150 to engage the interlock surface 152 and lock the seatback pivot 22 and the seatback 20 in the rear-entry position 54.

It is contemplated that the incorporation of the return pawl 78 and the plurality of blocking surfaces 182 of the interlock cam 150 serve to minimize the occurrence of failure modes and overexertion of certain components of the tip and slide mechanism 10. As such, these components promote smooth and efficient use of the tip and slide mechanism 10 for allowing occupants of the vehicle 12 to access portions of the passenger cabin 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
   a seatback having a seatback pivot rotationally coupled to a base, the seatback selectively operable about the seatback pivot between an upright position, a folded position and a rear-entry position, the rear-entry position defined between the upright and folded positions;
   an overslide cam that is selectively operable to an activation state that activates an overslide mechanism that selectively defines a sliding operation of the base to a forward-most position;
   a rear-access lever connected with the seatback pivot and the overslide cam, wherein operation of the rear-access lever to an engaged state places the overslide cam in a ready position proximate the seatback pivot; and
   a return pawl outwardly extending from an outer edge of the seatback pivot, wherein:
      rotation of the seatback pivot into the rear-entry position when the overslide cam is in the ready position further defines the activation state, wherein co-axial rotation of the seatback pivot and the return pawl about a center of the seatback pivot rotates the overslide cam to activate the overslide mechanism; and
      operation of the rear-access lever when the seatback pivot is proximate the rear-entry position defines a non-activation state, wherein movement of the overslide cam toward the ready position deflects the return pawl toward the seatback pivot such that the overslide cam is selectively maintained distal from the ready position, wherein the return pawl is outwardly biased relative to the seatback pivot, and wherein deflection of the return pawl is defined by rotation of the return pawl about a pawl pivot that is distal from the center of the seatback pivot.

2. The vehicle seat of claim 1, wherein the overslide cam in the ready position is free of direct engagement with an outer edge of the seatback pivot.

3. The vehicle seat of claim 1, wherein the return pawl includes a return spring that outwardly biases the return pawl to an outward state, and wherein deflection of the return pawl by the overslide cam selectively overcomes a biasing force applied by the return spring, and wherein slidable disengagement of the overslide cam from the return pawl allows the return spring to bias the return pawl into the outward state.

4. The vehicle seat of claim 1, wherein the return pawl includes an engaging portion and a deflecting portion, wherein the engaging portion of the return pawl selectively engages the overslide cam to rotate the overslide cam and operate the overslide mechanism, and wherein the deflecting portion is adapted to selectively block the overslide cam to prevent rotation of the overslide cam into the ready position.

5. The vehicle seat of claim 3, wherein the return pawl is included within a bracket interlock module that attaches to an outer edge of the seatback pivot, wherein the pawl pivot is located within the bracket interlock module.

6. The vehicle seat of claim 5, wherein the return spring is attached to the return pawl and a body of the bracket interlock module.

7. The vehicle seat of claim 1, further comprising:
   a seat-rotating mechanism that selectively operates the seatback at least between the upright and folded positions, wherein operation of the overslide cam to the activation state activates the seat-rotating mechanism, and wherein operation of the seatback from the rear-entry position to the upright position deactivates the seat-rotating mechanism.

8. The vehicle seat of claim 5, wherein selective forward operation of the base from a home position toward the forward-most position activates an interlock cam to define a blocking position, wherein the blocking position selectively retains the seatback pivot in the rear-entry position until the base is returned to the home position.

9. The vehicle seat of claim 8, wherein an interlock actuator includes a blocking surface that corresponds to a respective blocking position, wherein the blocking surface selectively engages an interlock surface defined within the bracket interlock module.

10. A vehicle seat comprising:
    a seatback pivot;
    a rear-access lever that rotates an overslide cam; and
    a pawl of the seatback pivot, wherein operation of the rear-access lever with the seatback pivot in a first rotational range causes selective rotation of the overslide cam by the pawl, and wherein operation of the rear-access lever with the seatback pivot in a second rotational range causes a deflection of the pawl by the overslide cam, wherein the rear-access lever includes an actuating surface that engages a portion of the overslide cam, wherein operation of the rear-access lever rotates the actuating surface to position the overslide cam in a ready position.

11. The vehicle seat of claim 10, wherein the actuating surface extends around only a portion of the rear-access lever, and wherein after the overslide cam is in the ready position, operation of the seatback pivot toward the second rotational range rotates the overslide cam and disengages the actuating surface from the overslide cam, wherein the rear-access lever returns to an idle state.

12. The vehicle seat of claim 10, wherein the pawl is outwardly biased relative to the seatback pivot, and wherein deflection of the pawl is defined by rotation of the pawl about a pawl pivot that is distal from a center of the seatback pivot.

13. The vehicle seat of claim 10, wherein the overslide cam in the ready position is free of direct engagement with an outer edge of the seatback pivot.

14. The vehicle seat of claim 10, wherein the pawl includes a return spring that outwardly biases the pawl to an outward state, and wherein deflection of the pawl by the overslide cam selectively overcomes a biasing force applied by the return spring, and wherein slidable disengagement of the overslide cam from the pawl allows the return spring to bias the pawl into the outward state.

* * * * *